Nov. 21, 1961 — B. H. EAKIN — 3,009,729
TENSION TYPE RELEASE COUPLER
Filed Aug. 8, 1958 — 4 Sheets-Sheet 1

INVENTOR
BIRCH H. EAKIN

Nov. 21, 1961  B. H. EAKIN  3,009,729
TENSION TYPE RELEASE COUPLER
Filed Aug. 8, 1958  4 Sheets-Sheet 4

INVENTOR
BIRCH H. EAKIN

BY
ATTORNEYS.

3,009,729
TENSION TYPE RELEASE COUPLER
Birch H. Eakin, Rte. 1, Silver Spring, Md.
Filed Aug. 8, 1958, Ser. No. 754,116
3 Claims. (Cl. 294—83)
(Granted under Title 35, U.S. Code (1952), sec. 266)

The invention described herein may be manufactured and used by or for the Government of the United States of America for governmental purposes without the payment of any royalties thereon or therefor.

This invention relates to an automatic load release coupler adapted to automatically release a load suspended therefrom upon deposition of the load. It is particularly adaptable for use in depositing mines or instruments upon the ocean floor, it may be advantageously employed in releasing loads delivered by parachute or other devices where the load is released on deposit.

In the past, when it was necessary to deposit mines, instruments or the like which must be handled gently, it has been customary to use trip devices which depend upon a second line or devices which rupture a weak link in the supporting cable. In the first instance there is need for extra attention and equipment. The use of an extra line for releasing trip devices often results in a tangle of lines as ocean currents turn and twist the load being deposited. This makes it necessary to either raise the load or send down a diver to release the trip device. The use of a second line to release a trip is found impractical, while the latter method necessitates the loss of equipment with the chance of injuring delicate instruments.

The present invention seeks to overcome these difficulties in the manner of the coupler shown in patent application of Kenneth F. Cannon, Jr., filed October 24, 1956, Serial Number 618,159. The coupler of the present invention seeks to improve on the coupler of the above-mentioned application in providing a coupler which is easier to operate and which in operation has proved to have overcome the defects present in the coupler of the above-mentioned application.

The object of the present invention is to provide a coupler which will automatically release a suspended load upon contact of the load with the ground.

It is a further object to provide a coupler which will automatically release a load upon contact with the bed of the sea and will be unaffected by pressure due to varying depths at which the load is deposited.

It is a further object of the invention to provide a spring loaded supporting member which will automatically release its load when the weight supported is slightly less than the strength of the spring.

It is a still further object of the invention to provide an automatic release coupler which has a safety pin which need not be removed until the load is completely lifted and ready to clear the ship.

It is a still further object to provide a coupler which may be handled completely by one man and which needs no trip lines or rupturable devices and which will automatically release a suspended load when so much of the load is supported that the remaining suspended weight is only slightly less than the strength of the coupler spring.

Other objects and many of the attendant advantages of this invention will be readily appreciated as the same becomes better understood by reference to the following detailed description when considered in connection with the accompanying drawings wherein.

Figure 1:
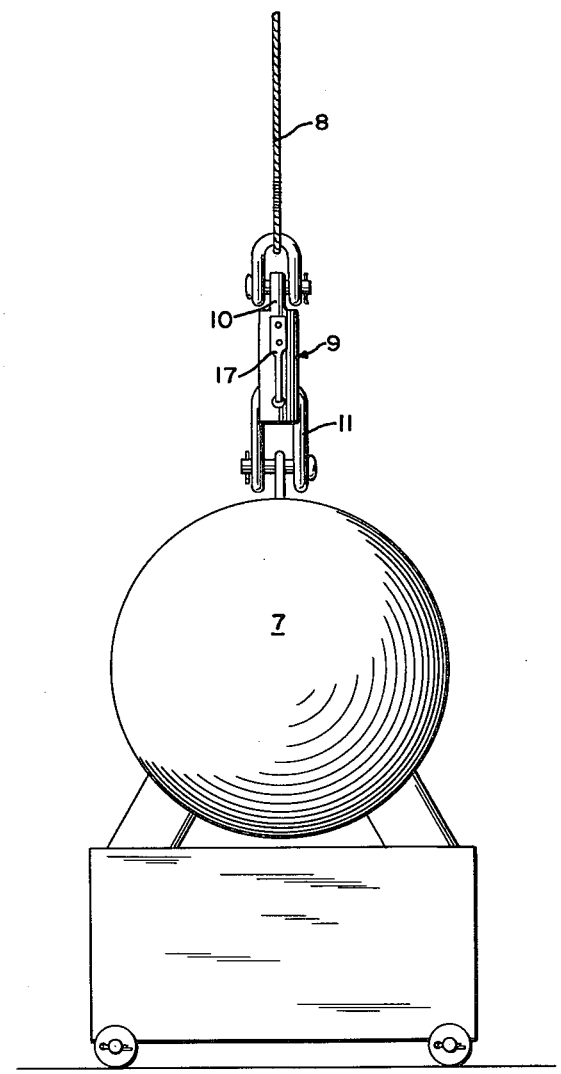
FIG. 1 is a front elevation showing the coupler in use.

Referring to the drawings, a supporting cable 8 carried by a ship's crane or other lifting device has at its free end the automatic release coupler 9 connected to the cable 8 through an eye 10 which is an integral part of the coupler. A shackle 11 is connected to the coupler and in turn supports a load 7 which in the specific showing is a mine, adapted to be deposited on the ocean floor.

Figure 2:
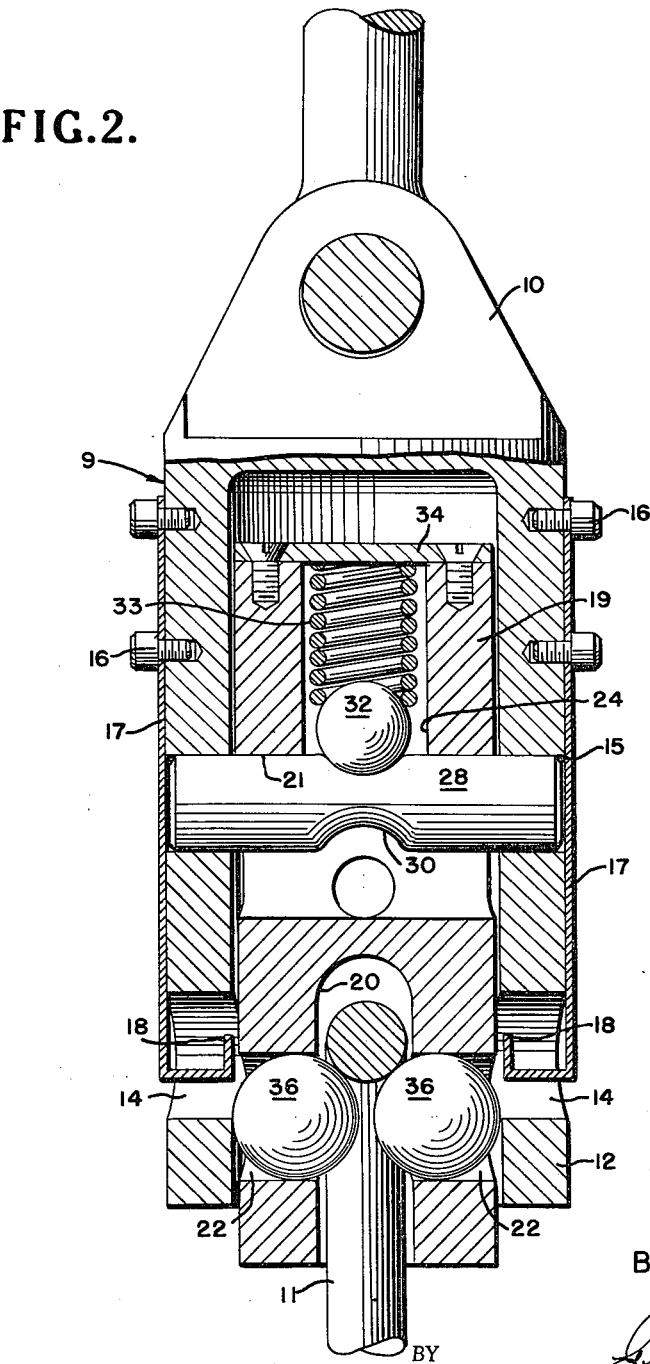
FIG. 2 is a vertical cross-section showing the coupler in load supporting position.
Figure 3:
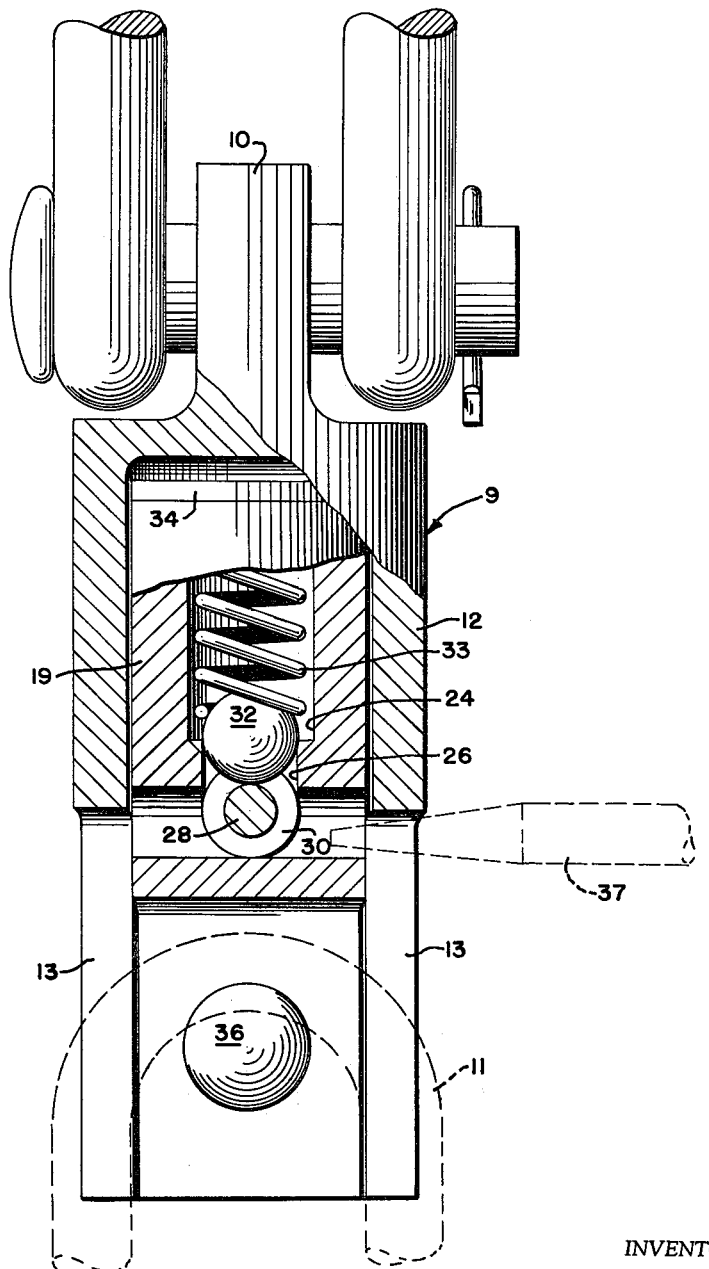
FIG. 3 is a vertical cross-section at right angles to that of FIG. 2 with the coupler in free position.
Figure 4:
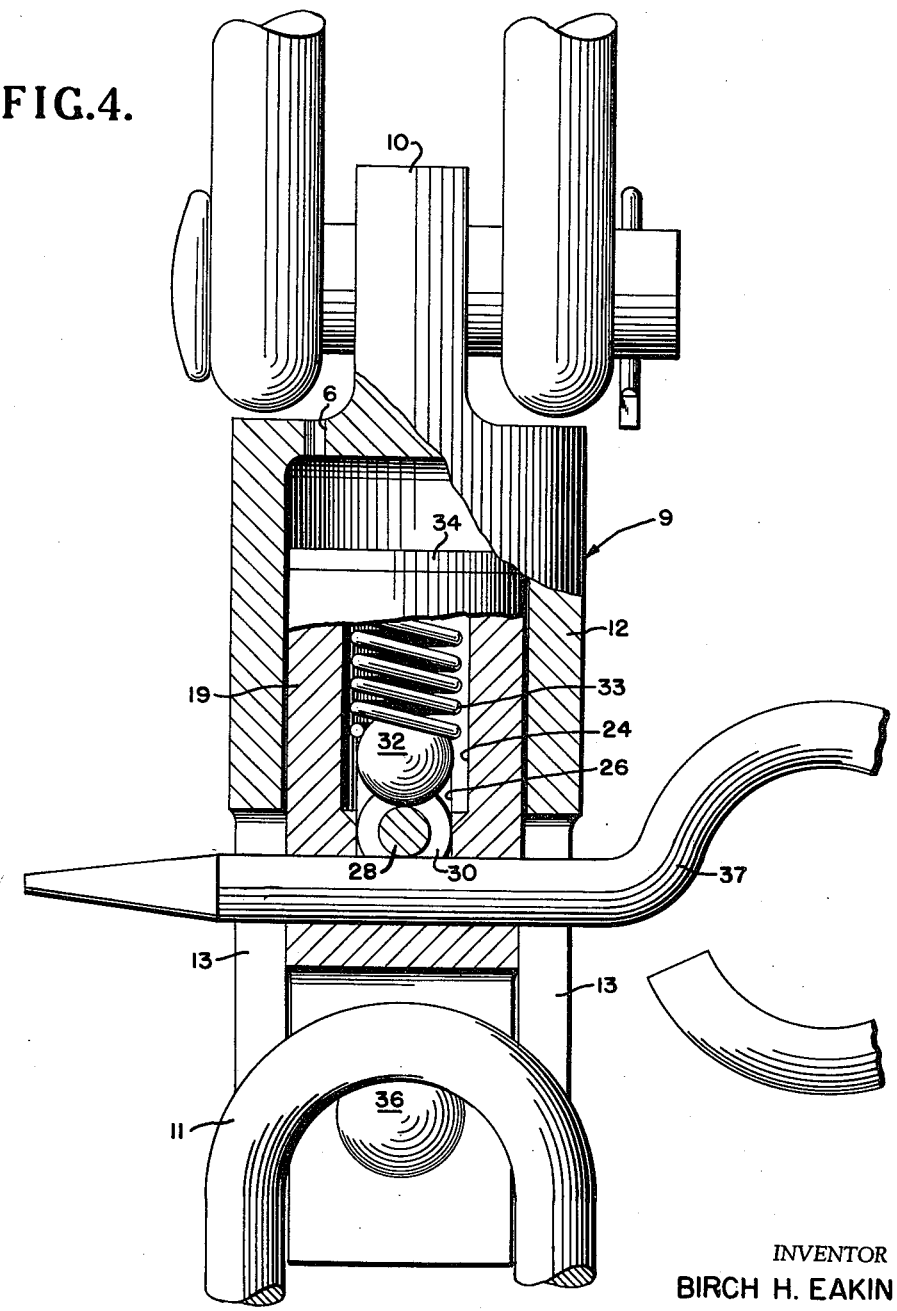
FIG. 4 is a view similar to FIG. 3 with the safety loading pin in position, the load attached but not fully supported.

FIGS. 2 and 3 illustrate the details of the coupler which is generally a cylindrical sleeve 12 closed at one end except for venting hole 6 by the supporting eye 10 and formed in its lower half with diametrically opposite vertical slots 13. Adjacent the lower extremity and at 90° from the vertical slots are holes 14 which are located on a diametric line. The cylindrical sleeve has a second pair of holes 15 located on a diametric line and at approximately the mid section.

Secured to the outer wall of the sleeve by screws 16 are spring strips 17, which are bent at their ends 18 and extend into the holes 14. This sleeve is formed of steel and has extreme strength.

Slideable in the cylindrical sleeve is a plunger 19 formed in its lower section with a vertical slot 20 adapted to receive the load supporting shackle 11. Also formed at the lower end of the plunger and in each of the halves formed by the slot are holes 22 equal in size to holes 14 and with the plunger in its upper position, the holes 22 align with the holes 14.

The upper end of the plunger has a well 24 opening into a diametric bore 26 oval shaped in cross-section which receives the pin 28 securely supported in diametric holes 17 of the sleeve. The pin 28 has a central annular depression 30 which supports a ball 32 held in tight contact with the depression 30 by a coil spring 33 carried in the well 24. A plate 34 caps the well 24 and serves to put the spring into compression against the ball and its supporting pin.

The lower holes 22 of the plunger have mounted therein two balls 36 which in diameter very closely approach the diameter of the holes 22 of the plunger and 14 of the sleeve. The lower ends 18 of the spring strips 17 normally retain the balls in the holes 22 but subject to an outward thrust on the balls will spring outward to permit a portion of the balls 36 to enter the holes 14.

In the use of the automatic release coupler a load such as 7 is secured to a shackle 11 and the coupler brought into position over the load so that the shackle may be inserted into the aligned slots 20 and 13 passing between the balls 36, moving them momentarily partly into holes 14 and resting in the upper portion of the slot 20 and above the balls 36 which retain the shackle (without load) due to the spring pressure of the strips 17.

The sleeve is now manually gripped below the oval shaped opening 26 with the hand engaging the spring strips 17 to prevent the release of the shackle by a separation of the balls previous to picking up the load and a pin 37 is inserted in the lower portion of the oval shaped hole 26 and beneath the pin 28. This pin forces the plunger partially to its lower position and brings the balls 36 into contact with the walls of the sleeve, securely locking the shackle in position. The load is then lifted clear of the deck and at an appropriate time the pin 37 may be removed; the weight of the load being greater than the restoring force exerted by the spring 33.

When the weight of the load is supported by the coupling the plunger 19 moves downward (FIG. 2) relative to the sleeve bringing the upper edge 21 of the oval shaped opening into contact with the pin 28 thus supporting the load and permitting easy removal of the pin 37.

Upon the load contacting the floor of the sea, the shackle will be released when the weight of the supported load is just less than the restoring force of the spring. This renders it unnecessary to slacken the cable which, when slackened, sometimes tangles and catches in the load. With this coupler the supporting cable may be kept just taut enough to release the load without the cable going completely slack before release.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An automatic load release coupler comprising a cylindrical sleeve open at its lower end and having a pair of diametrically opposed holes through the sleeve adjacent said lower end, the other end of said cylindrical sleeve being closed and formed with an integral eye, means connected to said eye for raising and lowering said sleeve, a plunger reciprocable in said sleeve between an upper and a lower position thereof, means carried by the cylindrical sleeve and engaging said plunger for permanently connecting said sleeve and plunger, and permitting relative reciprocating motion therebetween, said plunger being bifurcated at its lower end thereby providing two portions spaced apart by a predetermined distance, and formed with a pair of diametrically disposed holes, one of said holes being in each of said portions, said diametrically disposed holes in said portions aligning with the diametrically opposed holes at the lower end of the cylindrical sleeve when the plunger is in said upper position, balls carried in the diametrically disposed holes of the plunger and confined by the wall of the cylindrical sleeve when the plunger is in said lower position, said balls having a diameter greater than said predetermined distance and less than the minimum diameter of the holes in said sleeve, closure means connected to said sleeve for preventing said balls from escaping outwardly of the holes in said sleeve, a load supporting shackle receivable in the lower bifurcated end of said plunger and retained by said balls when said plunger is in said lower position, said shackle carrying a load which normally holds the plunger in lower position, spring means of less force than the weight of the shackle carried load urging said plunger to said upper position, said balls moving into the diametrically disposed holes of the cylindrical sleeve and being contained therein by said closure means, thereby releasing the shackle upon movement of the plunger to the upper position by said spring means when a substantial portion of the weight of the load is removed therefrom and before the entire weight of the load is released from the supporting plunger as the load comes to rest on a surface.

2. An automatic load release coupler according to claim 1 and including means locking said plunger in said lower position.

3. An automatic load release coupler according to claim 2 wherein the locking means is a manually operated pin engaging both said cylindrical sleeve and said plunger.

References Cited in the file of this patent

UNITED STATES PATENTS

| | | |
|---|---|---|
| 2,435,444 | Johnsen | Feb. 3, 1948 |
| 2,729,495 | DeJean | Jan. 3, 1956 |